United States Patent Office 3,684,748
Patented Aug. 15, 1972

3,684,748
FLAME-RETARDANT POLYURETHANE COMPOSITIONS COMPRISING A PHOSPHORUS-CONTAINING POLYOL AND AN AROMATIC CARBOXYLIC ACID ANHYDRIDE
Walter P. Barie, Jr., Shaler Township, Allegheny County, Norman W. Franke, Penn Hills Township, Allegheny County, and Gary M. Singerman, Monroeville, Borough, Pa., assignors to Gulf Research & Development Company, Pittsburgh, Pa.
No Drawing. Filed May 19, 1970, Ser. No. 38,877
Int. Cl. C08g 22/08, 22/44
U.S. Cl. 260—2.5 AJ                7 Claims

ABSTRACT OF THE DISCLOSURE

Flame-retarded polyurethane materials and foams containing a flame-retarding amount of a synergistic combination of a phosphorus-containing polyol having from two to about eight hydroxyl groups and a carboxylic acid anhydride having at least two groups including the anhydro group which are reactive with an isocyanate group.

---

The use of certain additives for the purpose of reducing the flammability of polyurethane materials and polyurethane foams is well known to those skilled in the art. Among the additives currently employed for such use are various types of phosphorus-containing compounds. The phosphorus compounds are generally used either alone or in combination with other materials such as organic or inorganic compounds of antimony or halogenated organic materials. The phosphorus-containing compounds may be non-reactive chemicals such as tris(2-chloroethyl)phosphate, tris(2,3-dibromopropyl)phosphate, ammonium phosphate, or more complicated hydroxy compounds which are reacted into the foam structure. Antimony trioxide is also used to reduce the flammability of urethanes, especially in combination with other materials such as a halogenated hydrocarbon or ammonium phosphate.

One drawback of these known compounds and combinations of compounds, however, has been the fact that generally large amounts (up to 35 percent) of the additive must be incorporated into the urethane polymer in order to render it acceptably flame-resistant. Such large quantities of additives often have a deleterious effect upon the properties of the foam. Mineral fillers tend to settle out; foams are weakened and show a tendency to shrink; some additives tend to crystallize or oil out of the polymer (plasticizer migration) after a relatively short time of incorporation therein.

We have now found that superior flame-retarding properties can be imparted into polyurethane resins, particularly rigid polyurethane foams, by incorporating into the polymer a flame-retarding combination of a mixture of a phosphorus-containing polyol and an aromatic carboxylic acid anhydride, both of which are defined as set forth hereinbelow, the total amount of both components being less than required for flame-retardancy if they were functioning by a simple additive effect.

The novel synergistic combination provides improved flame retardancy over the additives of the prior art, and additionally, provides this superior result at materially lower concentrations than previously found to be necessary for the known additives.

The results shown by the use of the above-mentioned flame-retardant combination are surprising and unexpected in that the combination provides a greater degree of flame-retardancy than one would expect from the results shown by the use of the components individually, i.e., they are synergistic. Moreover, the combination produces flame-retardancy at lower concentrations in the polymer than heretofore required for the individual materials. Additionally, the effectiveness of the combination is achieved in the absence of any third ingredient, such as compounds of antimony which were previously believed to be necessary.

It is therefore an object of the present invention to provide flame-retardant compositions comprising polyurethane resins containing a flame-retarding amount of a synergistic combination of a phosphorus-containing polyol and an aromatic carboxylic acid anhydride.

It is a further object of the present invention to provide flame-retardant compositions comprising a rigid polyurethane foam containing a flame-retarding amount of a synergistic combination of a phosphorus-containing polyol and an aromatic carboxylic acid anhydride.

These and other objects of the instant invention will become more apparent to those skilled in the art upon reading the more detailed description set forth hereinbelow.

As mentioned above, the first essential component of our novel flame-retardant composition is an acid anhydride, preferably an aromatic acid anhydride. The preferred aromatic acid anhydrides include those having a benzene, naphthalene, heterocyclic, diphenyl, diphenyl ketone, diphenyl ether or diphenyl alkane nucleus.

A second requirement in regard to the aromatic anhydrides suitable for use herein is that, in addition to the acid anhydride group, the aromatic anhydride must have at least one additional substituent which is reactive with an isocyanate group. Such reactive substituents include substituents containing active hydrogen groups, which, as is known, react as a consequence with Zerewitinoff reagent (methylmagnesium bromide in a high-boiling ether). Such active substituents include hydroxyl groups, primary and secondary amino groups, carboxyl groups, and other groups containing active hydrogen. (For a comprehensive listing, see Kharasch and Reinmuth, Grignard Reactions of Non-Metallic Substances, pp. 1169–1171, Prentice-Hall, 1954). In addition to such groups containing Zerewitinoff hydrogens, as defined above, the isocyanato-reactive groups may comprise another intramolecular anhydride group as in the case of pyromellitic dianhydride-type structures.

Illustrative of the anhydride reactants which may be used are hemimellitic anhydride,
trimellitic anhydride,
methyltrimellitic anhydride,
hydroxyphthalic anhydride,
pyromellitic dianhydride,
1,2,3,4-benzenetetracarboxylic dianhydride,
3,3′,4,4′-benzophenonetetracarboxylic dianhydride,
4′-carboxy diphenyl-3,4-dicarboxylic anhydride,
diphenyl-3,3′,4,4′-tetracarboxylic dianhydride,
diphenyl-2,2′,3,3′-tetracarboxylic dianhydride,
naphthalene-2,3,6,7-tetracarboxylic dianhydride,
naphthalene-1,2,5,6-tetracarboxylic dianhydride,
naphthalene-1,2,4,5-tetracarboxylic dianhydride,
naphthalene-1,4,5,8-tetracarboxylic dianhydride,
aminonaphthalene-1,8-dicarboxylic anhydride,
2,6-dichloronaphthalene-1,4,5,8-tetracarboxylic dianhydride,
2,7-dichloronaphthalene-1,4,5,8-tetracarboxylic dianhydride,
2,3,6,7-tetrachloronaphthalene-1,4,5,8-tetracarboxylic dianhydride,
phenanthrene-1,3,9,10-tetracarboxylic dianhydride,
bis(2,3-dicarboxyphenyl)methane dianhydride, bis(3,4-dicarboxyphenyl)methane dianhydride,
1,1-bis(3,4-dicarboxyphenyl)ethane dianhydride,
2,2-bis(2,3-dicarboxyphenyl)propane dianhydride,
2,2-bis(3,4-dicarboxyphenyl)propane dianhydride,
bis(3,4-dicarboxyphenyl)sulfone dianhydride,
bis(3,4-dicarboxyphenyl)ether dianhydride,
pyrazine-2,3,5,6-tetracarboxylic dianhydride and
thiophene-2,3,4,5-tetracarboxylic dianhydride.

While any of the aromatic acid anhydrides defined and exemplified above can be employed in the invention, particularly preferred anhydrides are selected from those having the following formulae:

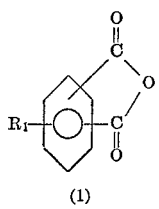 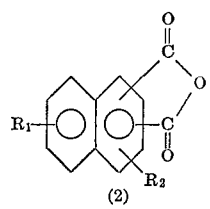
(1)  (2)

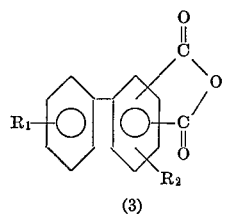 and 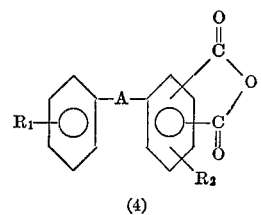
(3)  (4)

wherein the valences of the anhydro group are attached to adjacent carbon atoms in the benzene nucleus and wherein $R_1$ and $R_2$ each represent from 0 to 3 substituents and $R_1$ plus $R_2$ equal from 1 to 3 substituents, preferable 1, selected from carboxyl, hydroxyl, primary amino, lower-alkylamino or anhydro, wherein the carbon atoms of the latter are each attached to adjacent carbon atoms in an aromatic ring, and A is a bridging group selected from the class consisting of lower-alkylene, carbonyl, sulfonyl, and oxygen.

The term "lower-alkylamino" referred to above includes alkyl containing from 1 to 6 carbon atoms, inclusive. The term "lower-alkylene" means alkylene containing from 1 to 6 carbon atoms, inclusive, such as methylene, ethylene, 1,1-propylene, 1,2-propylene, 1,1-butylene, 2,2-butylene, 3,3-hexylene, and the like.

The second essential component of our novel flame-retardant composition is a phosphorus-containing polyol. A requirement in regard to the phosphorus-containing compounds suitable for use herein is that they contain at least two and up to about eight hydroxyl substituents per molecule which are reactive with an isocyanate group. This type of phosphorus-containing compound is referred to herein as a phosphorus-containing polyol. Such polyols are prepared by a number of ways which are well known to those skilled in the art, and many are available commercially. In fact, phosphorus-containing polyols are used to reduce the flammability of polyurethane foams, although when these materials are used as the sole flame-retarding agents, they must be used at significantly higher concentrations in the foam than when they are used in combination with acid anhydrides as described by the present invention.

Among the useful types of phosphorus-containing polyols that can be employed in the invention are those represented by the general formulae:

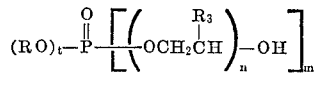

and

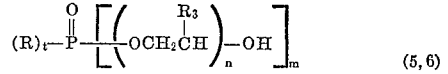
(5, 6)

wherein $n$ is a number from 1 to 7, $m$ is a number from 1 to 2, and $t$ is a number from 1 to 2, the sum of the numbers $t$ and $m$ being equal to three. R is an alkyl, hydroxyalkyl, alkoxyalkyl, aromatic (phenyl) or hydroxyphenyl group and may be represented by methyl, ethyl, hydroxymethyl, hydroxyethyl, isopropyl, isobutyl, tertiary butyl or amyl, etc. $R_3$ is hydrogen, methyl or ethyl. These materials are terminated in each of the oxyalkylation chains by a hydroxyl group so that the material contains active hydrogen atoms and is adapted to react with the polyisocyanate component, or with the acid anhydride, to form portions of the polyurethane molecules.

These phosphorus-containing polyol materials include compositions having the following formulae:

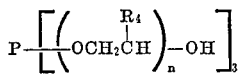

and

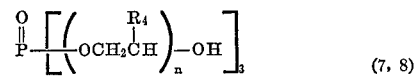
(7, 8)

wherein $n$ is a number from 1 to 7 and $R_4$ is hydrogen, methyl, ethyl or phenyl groups and may be substituted with noninterfering substituents, such as halogen atoms, ether and ester radicals and the like. Exemplary of the compounds having Formula 7 are tris(polyalkyleneglycol) phosphites such as tris(dipropyleneglycol)phosphite and other tris(polypropyleneglycol)phosphites, tris(diethyleneglycol)phosphite and the like. Suitable compounds having the structure of Formula 8 include tris-dipropyleneglycol phosphate, dipropyleneglycol pentol triphosphate, and phosphoric acid-propylene oxide adducts; and dialkyl dialkanolaminoalkylphosphonates having the formula:

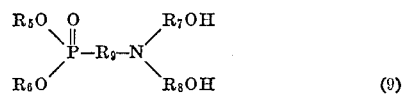
(9)

where $R_5$ and $R_6$ are selected from the group consisting of lower alkyl and lower haloalkyl radicals; $R_7$ and $R_8$ are lower alkylene radicals and $R_9$ is a lower alkylene radical. Specific illustrative examples include O,O'-diethyl N,N-bis(2-hydroxyethyl)aminomethylphosphonate; O,O' - bis-(2-chloroethyl) N,N - bis(2-hydroxyethyl)aminomethylphosphonate; and O,O'-diphenyl N,N-bis(2-hydroxypropyl)aminomethylphosphonate; and O,O'-bis(4-hydroxybutyl) N,N - bis(2-hydroxyethyl)aminoisopropylphosphonate. The first mentioned of these four compounds is preferred; a hydoxyalkyl polyphosphate that is represented by the formula:

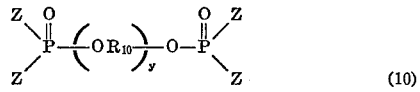
(10)

wherein $R_{10}$ represents the divalent residue of a vicinal epoxide, $y$ represents a number that has a value from 1 to 6, and wherein each Z individually represents the group:

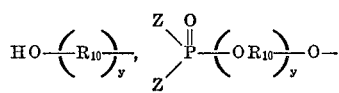

or $R_{11}O-$ where $R_{11}$ is an alkyl group having from one to six carbon atoms with at least two Z groups in the molecule being $HO(R_{10}O)_y$.

The preferred phosphorus-containing polyols for use in this invention are the hydroxyalkyl polyphosphates or the O,O'-disubstituted N,N-bis(hydroxyalkyl)aminoalkylphosphonates.

The polyurethane materials and foams of this invention are prepared by reacting a mixture of the aromatic acid anhydride and the phosphorus-containing polyol, both of which are described hereinabove, with a nonphosphorus-containing polyol and an organic polyisocyanate and optionally to the reaction system such assistants may be added as a silicone oil and the like to serve as surfactant. Also an amine or organo tin compound and the like can be added as a catalyst and a blowing agent if a foamed material is desired.

The non-phosphorus-containing polyols are well known by those skilled in the urethane art, and any of the usual polyols normally used to prepare polyurethanes may be utilized in this invention. Illustrative of these non-phosphorus containing polyols are polyethers such as polyoxyalkylene glycols, for example, those obtained by the addition of one or more alkylene oxides such as ethylene oxide, propylene oxide, and the like, to water, ethylene glycol, propylene glycol, diethylene glycol, dipropylene glycol and the like or mixtures thereof; polyether glycols prepared by reacting ethylene oxide, propylene oxide or mixtures thereof with mono- and poly-nuclear dihydroxybenzenes such as catechol, resorcinol, hydroquinone, orcinol, 2,2-bis(p-hydroxyphenyl)propane, bis(p-hydroxyphenyl)methane, and the like; polyethers prepared by reacting ethylene oxide, propylene oxide, and like alkylene oxides or mixtures thereof with aliphatic polyols such as glycerol, sorbitol, trimethylolpropane, 1,2,6-hexanetriol, pentaerythritol, sucrose, or glycosides such as the methyl, ethyl, propyl, butyl and 2-ethylhexyl derivatives of arabinose, xylose, fructose, glucose, rhamnose, and the like; and polyethers prepared by reacting ethylene oxide, propylene oxide and like alkylene oxides or mixtures thereof with alicyclic polyols such as tetramethylol cyclohexanol, trimethylol cyclohexanol, and the like, polyols containing a heterocyclic nucleus such as 3,3,5-tris(hydroxymethyl)-5-methyl-4-hydroxytetrahydropyran, 3,3,5,5-tetrakis(hydroxymethyl)-4-hydroxytetrahydropyran, and the like, and polyhydric phenols such as 2,2-bis(hydroxyphenyl) ethanol, pyrogallol, phloroglucinol, poly(hydroxyphenyl) alkanes, for example, 1,1,3-tris(hydroxyphenyl)ethanes, 1,1,3,3-tetrakis(hydroxy-3-methylphenyl)propanes, 1,1,4,4-tetrakis(hydroxyphenyl)butanes, and the like.

The non-phosphorus-containing polyols which can be employed in the present invention also include the adducts of primary aromatic mono- and poly amines with alkylene oxides such as ethylene oxide, propylene oxide, and the like or mixtures thereof. Examples of primary amines from which such adducts can be prepared are aniline, toluidine, xylidine, benzidine, o-tolidine, o-, m-, and p-phenylenediamine, 2,4- and 2,6-diaminotoluene, 2,4,6-triaminotoluene, 3,4,5-triaminotoluene, 4,4'-methylenedianiline, 4,4'-ethylidenedianiline and the like, as well as polyamines prepared by interaction of aromatic primary amines such as aniline, o-toluidine, p-chloroaniline, p-bromoaniline and the like with formaldehyde and the like aldehydes in the presence of a mineral acid such as hydrochloric acid. Particularly useful polyols of the above type derived by reaction of alkylene oxides and polyamines are those comprising a polyol adduct produced by mixing under hydroxyalkylation conditions from 2 to 20 molecular equivalents of ethylene oxide, propylene oxide or 1,2-butylene oxide, or mixtures thereof, and one amine equivalent of a polyamine mixture, 100 parts of said polyamine mixture containing from 35 to 90 parts of methylenedianilines, the remaining parts being triamines and polyamines of higher molecular weight, said methylenedianilines, triamines, and polyamines of higher molecular weight having been formed by acid condensation of aniline and formaldehyde.

The polyols which can be employed in the present invention also include other N,N-di(hydroxyalkyl)amines such as O,O'-bis(diethanolaminomethyl)-p-nonylphenol. N,N,N',N' - tetra - (2-hydroxypropyl)ethylenediamine, N,N,N',N'-tetra(2-hydroxyethyl)ethylenediamine, and the like hydroxyalkylated aliphatic diamines.

Other useful non-phosphorus-containing polyols include polyols which are half esters derived by reacting a polycarboxylic acid intramolecular anhydride with a polyol of equivalent weight of 70 to 200 and average functionality of 2 to 8 such as those prepared from dibasic carboxylic acids and polyhydric alcohols, preferably trihydric alcohols. The dibasic carboxylic acids useful in preparing the polyesters have no functional groups containing active hydrogen atoms other than their carboxylic acid groups. They are preferably saturated. Examples of such acids are phthalic acid, terephthalic acid, isophthalic acid, succinic acid, glutaric acid, adipic acid, pimelic acid and the like. Examples of polyhydric alcohols used to form the above polyesters are trimethylolethane, mannitol, 1,2,6-hexanetriol, glycerol, pentaerythritol, and the like. Minor proportions of dihydric alcohols such as ethylene glycol, diethylene glycol, 1,2-propylene glycol, 1,4-butanediol and the like, can also be used in combination with trihydric and higher polyhydric alcohols in the preparation of the above polyesters.

The polyester polyols which can be employed also include polyesters obtained by condensation of a lactone such as epsilon-caprolactone, epsilon-caprolactone substituted by one or more alkoxy, alkyl, aralkyl or cycloalkyl groups, and the like, with a glycol such as ethylene glycol, propylene glycol, and the like, a diamine such as ethylene diamine, 1,2-propylenediamine, and the like, or an alkanolamine such as ethanolamine, propanolamine, isopropanolamine, and the like, in accordance with procedures well known in the art, for example, those described in U.S. 2,914,556.

The isocyanates employed to produce the urethane polymers of this invention include any of the prior art organic polyisocyanates that are normally employed in the production of polyurethanes. Specific illustrative examples include the following: 2,4-toluene diisocyanate, 2,6-toluene diioscyanate, diphenylmethane diisocyanate (MDI), polymethylene polyphenylsicocyanate (PAPI), 1,2,4-benzene triisocyanate, 1,3,3-pentane triisocyanate, 1,2-propylene diisocyanate, 1,2,4-butane triisocyanate, triphenylmethane triisocyanate, diphenyl diisocyanate, triphenyl diisocyanate, chlorophenyl diisocyanate, 1,4-tetramethylene diisocyanate; para-phenylene diisocyanate, hexamethylene diisocyanate, 3,3'-dimethyl-4,4'-biphenylene diisocyanate, 3,3'-dimethoxy-4,4'-biphenylene diisocyanate, the liquid reaction products of (1) diisocyanates and (2) polyols or polyamines, and the like. In addition mixtures of isocyanates may be employed as well as the many impure or crude polyisocyanates that are commercially available such as crude mixtures of methylene bis(4-phenylisocyanate).

Of the organic polyisocyanates, the aryl and alkaryl polyisocyanates of the benzene and naphthalene series are more reactive and less toxic than the aliphatic members. Consequently, the aromatic compounds are preferred in the present invention.

These polyisocyanate components are advantageously used in a so called "one-shot" system, wherein they are stored separately from the polyol, including the phosphorous polyol and acid anhydride components until the foam is to be formed. The polyisocyanate component is then added to the other components which may, if preferred, be made up into a preformed master batch mixture to which the polyisocyanate component is added as rapidly as practicable. The mixture is then allowed to foam and cure. Alternatively, one may, if preferred, prepare a mixture of the isocyanate and the acid anhydride, constituting what may be termed "package A," while the remaining components may be made up into a preformed master batch, termed "package B." "Package A" and "package B" are then combined as rapidly as possible, and the mixture is then allowed to foam and cure.

In preparing the polyurethane compositions of this invention the polyisocyanate, the polyol materials, the acid anhydride and other isocyanate-reactive groups, if present, are reacted in a stoichiometric ratio such that for every one equivalent of isocyanate groups, the sum of the equivalents of hydroxyl groups, acid anhydride groups, and other isocyanato-reactive groups, if present, is also one equivalent or else a slight excess, up to 10 percent, of equivalents of either the polyisocyanate or mixture of polyols, anhydride and other reactive material may be used. Preferably, the proportions of reactants are sufficient to provide a ratio of isocyanate group to those groups reactive with the isocyanate group of about 1.05 to 1. The small excess of isocyanate reactant is used to insure complete reaction, although strict adherence to this ratio is not essential.

The concentrations of phosphorus-containing polyol and acid anhydride are variable, depending upon the degree of flame retardancy desired in the urethane foam, but even small amounts can be effective. Thus for a form derived primarily from polymethylene polyphenylisocyanate and a propylene oxide adduct of trimethylolpropane, a mixture of about five percent of 3,3',4,4'-benzophenonetetracarboxylic dianhydride and about 0.2 percent of the element phosphorus, (added as diethyl N,N-bis(2-hydroxyethyl)aminomethylphosphonate) by weight of reactants, exclusive of the weight of blowing agent, effectively flame retards the foam. Different combinations of anhydride, phosphorus-containing polyols, polyisocyanates, and non-phosphorus-containing polyols will require more or less of the anhydride and phosphorus compound, depending upon the individual components to achieve flame retardancy, but the total amount of the anhydride and phosphorous-containing polyol will still be less than the amount required for flame-retardancy if they were functioning by a simple additive effect.

Any foaming agent commonly used in the art can be employed. Suitable foaming agents are those materials capable of liberating gaseous products when heated or when reacted with an isocyanate. The preferred foaming agents are the fluorochlorocarbons boiling in the range of about 20° C. to about 56° C. and mixtures thereof, for example, trichlorofluoromethane, trichlorotrifluoroethane, dichloromonofluoromethane, monochlorethane, monochloromonofluoroethane, difluromonochloroethane, difluorodichloroethane. Other foaming agents which can be employed include water, a tertiary alcohol and a concentrated acid such as is disclosed in U.S. Pat. No. 2,865,869, polymethylol phenols, dimethylolureas, polycarboxylic compounds and formic acid. Mixtures of any of the above foaming agents may also be used. The amount of foaming agent used is not critical but will be dictated by the type of foam desired. If a very dense foam is desired, only a small amount need be used. If a very light foam is desired, a maximum amount should be used. The amount used will also depend upon the particular foaming agent.

If desired, a reaction catalyst can be employed in preparing the composition of the invention. The catalysts employed can be any of the known conventional catalysts for isocyanate reaction. Such catalysts include a wide variety of compounds, for example, tertiary amines such as N - methylmorpholine, N,N,N',N' - tetramethyl-1,4-butanediamine, 1,4 - diazabicyclo[2.2.2]octane, 1,1,3,3-tetramethylguanadine and the like. Also useful as catalysts are organic tin compounds such as stannous octoate, dibutyltin dilaurate, dibutyltin diacetate, and the like. Many combinations of catalysts can be employed; for instance, it is at times useful to employ one or two tertiary amines in combination with an organotin compound such as dibutyltin dilaurate. Catalysts, if employed, are preferably used in an amount of about 0.1 percent up to about 5 percent by weight, based upon the reactive components in the foamable mixture.

There may also be incorporated into the reaction composition various conventional foam stabilizers to control the cellular structure of the foamed polyurethane obtained. Used for this purpose are various surfactants including various silicone compounds and silicone oil mixtures, e.g., dimethylsiloxane and alkylsilane-polyoxyalkylene glycol copolymers sold under various names such as "Silicone L–520" and "Dow Corning 195," etc. About 0.1 to three parts of the foam stabilizing agent per 100 parts by weight of the polyol and polyisocyanate reactants are preferred.

The following examples serve to illustrate the invention but are not intended as limitations. All parts and percentages used in the examples are by weight unless otherwise indicated.

EXAMPLE 1

This example illustrates the preparation of a rigid polyurethane foam using a combination of 3,3',4,4'-benzophenonetetracarboxylic dianhydride (BTDA) and polyoxypropylene alkoxy diphosphate as the flame retardant. The diphosphate is a commercially available material which is a mixture of related molecules having the following structure:

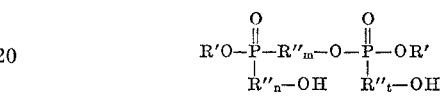

wherein $m$, $n$ and $t$ vary from 1 to 7, R' is either ethyl or n-butyl, depending upon the individual molecule and R" is the group —O—CH$_2$CH(CH$_3$)— such that the material has a hydroxyl number of about 205, a phosphorus content of about 11.3 percent and a viscosity at 25° C. of about 250 cps.

| Ingredient: | Parts |
|---|---|
| Propylene oxide adduct of trimethylolpropane [1] | 61.63 |
| Polyisocyanate [2] | 70.10 |
| Diphosphate | 4.69 |
| 3,3',4,4' - benzophenonetetracarboxylic dianhydride | 7.36 |
| N,N,N',N'-tetramethylbutane-1,4-diamine | 2.00 |
| Surfactant [3] | 1.50 |
| Fluorotrichloromethane | 21.0 |

[1] A propylene oxide adduct of trimethylolpropane having a basic functionality of 3, an average molecular weight of about 425, and a hydroxyl number of about 397.
[2] A polymethylene polyphenylisocyanate having an isocyanate equivalent of about 133.5, an available NCO content of about 32 percent and a viscosity at 25° C. of about 250 cps.
[3] A polysiloxane-polyoxyalkylene block copolymer used as a foam stabilizer or surfactant.

Example 1 is made to contain 3.18 percent by weight of the diphosphate so that the total formulation contains 0.36 percent of phosphorus by weight, exclusive of the foaming agent, CFCl$_3$. In Example 1, the polyisocyanate and the acid anhydride were blended to a smooth, creamy mixture on a three-roll mill. This mixture is termed "Package A." In a separate container, the remaining ingredients were blended to a homogeneous mixture by means of an air-driven stirrer and termed "Package B." "Package A" and "Package B" were then combined as rapidly as possible and blended thoroughly with an air-driven stirrer. The foaming characteristics were cream time of about 29 seconds and a rise time of about 110 seconds after the mixture was poured into an open 2.5-inch x 8-inch x 10-inch cardboard box. The density of the resulting rigid foam was 2.35 p.c.f., and was classified as self-extinguishing according to ASTM test D1692–59T, with an extent of burning before self-extinguishment equal to 1.61 inches.

EXAMPLES 2–22

The formulations used in these examples are essentially identical to the formulation of Example 1, except that varying amounts of the diphosphate and 3,3',4,4'-benzophenonetetracarboxylic dianhydride were used. In every example the isocyanate to hydroxyl plus anhydride ratio was the same as in Example 1, about 1.05 to 1. The mixtures were tested for flame retardancy in accordance with the procedure of Example 1. The resulting foams had properties shown in Table 1.

TABLE 1

| Percent BTDA [1] | Percent P [1] | Density (p.c.f.) | Rating [2] | Burning (n./min.) | Inches burned |
|---|---|---|---|---|---|
| 5.0 | | 2.35 | S.E. | | 1.61 |
| | | 2.22 | Burning | 14.8 | |
| 26.7 | | 3.33 | S.E. | | 1.00 |
| 16.2 | | 2.55 | S.E. | | 1.50 |
| 12.0 | | 2.56 | S.E. | | 1.32 |
| 11.0 | | 2.72 | Burning | 4.66 | |
| 10.0 | | 2.50 | do | 5.03 | |
| 9.0 | | 2.65 | do | 7.02 | |
| | 2.0 | 3.01 | S.E. | | 1.46 |
| | 1.0 | 2.53 | S.E. | | 2.18 |
| | 0.75 | 2.40 | S.E. | | 3.32 |
| | 0.74 | 2.34 | S.E. | | 3.12 |
| | 0.73 | 2.34 | S.E. | | 3.31 |
| | 0.72 | 2.40 | Burning | 2.53 | |
| | 0.70 | 2.41 | do | 3.61 | |
| | 0.65 | 2.44 | do | 3.23 | |
| | 0.50 | 2.43 | do | 3.88 | |
| 5.5 | 0.36 | 2.21 | S.E. | | 1.99 |
| 4.5 | 0.36 | 2.26 | S.E. | | 1.37 |
| 4.0 | 0.36 | 2.38 | S.E. | | 1.67 |
| 4.5 | 0.30 | 2.34 | S.E. | | 1.71 |
| 4.0 | 0.25 | 2.30 | Burning | 5.80 | |

[1] Percent by weight exclusive of the weight of the foaming agent, CFCl₃.
[2] Flammability rating described in ASTM D1692-59T. S.E.=self-extinguishing rating.

In Table 1, Examples 3 to 8 are necessarily listed in order to establish the effect on foam flammability of the acid anhydride alone. It is seeen that at 12 percent or more of the anhydride, the foam is self-extinguishing (Examples 3 to 5), but at 11 percent and lower (Examples 6 to 8), the foam burns. Examples 9 to 17 are necessary to show the effect of phosphorus alone. It is seen that at least 0.73 percent by weight of phosphorus is needed to render the foam self-extinguishing (Example 13). Anything less than this amount of phosphorus will allow the foam to burn (Examples 14 to 17). Examples 1 and 18 to 22 demonstrate the synergistic effect on flammability of combinations of the anhydride and the phosphorus-containing polyol. That is, if the effects of these two materials were simply additive, then a combination of 5.5 percent of BTDA and 0.36 percent of phosphorus (Example 18) should allow the foam to burn, since 11 percent of BTDA (Example 6) or 0.72 percent of phosphorus (Example 14) both allow the foam to burn. Surprisingly, combinations of amounts less than would be required by simple additivity requirements render the foam self-extinguishing (Examples 1 and 18 to 21).

EXAMPLE 23

This example illustrates the preparation of a rigid polyurethane foam using a combination of 3,3′,4,4′-benzophenone-tetracarboxylic dianhydride and diethyl N,N-bis-(2-hydroxyethyl)aminoethylphosphonate having a hydroxyl number of approximately 450, a nitrogen content of 5.2 to 5.8 percent, a phosphorus content of 12.2 to 12.6 percent and a viscosity of about 195 cps. at 22.8° C. as the flame retardant mixture.

Ingredient: Parts
Propylene oxide adduct of trimethylolpropane [1] _____ 67.0
Polyisocyanate [2] _____ 70.1
Phosphonate _____ 2.6
3,3′,4,4′-benzophenonetetracarboxylic dianhydride _____ 7.5
1,1,3,3-tetramethylguanidine _____ 1.5
Surfactant [3] _____ 1.5
Fluorotrichloromethane _____ 22

[1] A propylene oxide adduct of trimethylolpropane having a basic functionality of 3, an average molecular weight of about 425, and a hydroxyl number of about 397.
[2] A polymethylene polyphenylisocyanate having an isocyanate equivalent of about 133.5, an available NCO content of about 32 percent and a viscosity at 25° C. of about 250 cps.
[3] A polysiloxane-polyoxyalkylene block copolymer used as a foam stabilizer or surfactant.

The phosphonate used in this and in all other examples was analyzed so that the exact phosphorus content was known. This particular formulation was made to contain 1.73 percent by weight of phosphonate in that the total formulation contains 0.21 percent of phosphorus by weight, exclusive of the weight of the foaming agent, CFCl₃. After the polyisocyanate and anhydride are blended to a smooth, creamy mixture on a three-roll mill, the mixture was treated in accordance with the procedure of Example 1. The resulting rigid polyurethane foam had a density of 2.12 p.c.f., and was classified as self-extinguishing according to ASTM test D1692-59T, with an extent of burning before self-extinguishment of 1.50 inches.

EXAMPLES 24–26

The formulations used in these examples are essentially the same as the formulation of Example 23, except that varying amounts of the phosphonate, as defined in Example 23, and 3,3′,4,4′-benzophenonetetracarboxylic dianhydride were used. The isocyanate to hydroxyl plus anhydride ratio is approximately the same as in Example 23. The mixtures were tested in accordance with the procedure of Example 1. The resulting foams had properties shown in Table II.

TABLE II

| Percent BTDA [1] | Percent P [1] | Density (p.c.f.) | Rating [2] | Burning (in./min.) | Inches burned |
|---|---|---|---|---|---|
| 4.99 | 0.21 | 2.12 | S.E. | | 1.50 |
| | 0.77 | 2.37 | S.E. | | 2.21 |
| | 0.61 | 2.21 | S.E. | | 2.58 |
| | 0.47 | 2.40 | Burning | 4.04 | |

[1] Percent by weight exclusive of the weight of the foaming agent, CFCl₃.
[2] Flammability rating described in ASTM D1692-59T. S.E.=self-extinguishing rating.

In Table II, Examples 24, 25 and 26 are necessarily listed in order to establish the effect of the phosphorus-containing polyol on flammability. Examples 24, 25, and 26 show that 0.47 percent phosphorus allows the foam to burn, and that larger amounts of phosphorus are required to render the foam self-extinguishing. Since 11 percent of 3,3′,4,4′-benzophenonetetracarboxylic dianhydride alone also permits the foam to burn (Example 6, Table I), then Example 23 illustrates a synergistic reduction in flammability when a combination of 3,3′,4,4′-benzophenone-tetracarboxylic dianhydride and phosphonate is used.

EXAMPLES 27–32

The formulations used in these examples are essentially identical to the formulation of Example 1. All the materials used in these examples are the same as those of Example 1 except that the anhydride (3,3′,4,4′-benzophenonetetracarboxylic dianhydride) of Example 1 was replaced in Examples 27 to 32 with the anhydrides listed in Table III. The mixtures were treated in accordance with the procedure of Example 1 and the resulting foams had properties shown in Table III.

TABLE III

| Percent anhydride [1] | Percent P [1] | Density (p.c.f.) | Rating [2] | Burning (in./min.) | Inches burned |
|---|---|---|---|---|---|
| 9.0 T | | 2.61 | Burning | 3.14 | |
| 4.0 T | | 2.34 | do | 5.40 | |
| 4.0 T | 0.36 | 2.08 | S.E. | | 1.58 |
| 18.0 Py | | 3.20 | S.E. | | 1.25 |
| 10.0 Py | | 2.08 | Burning | 6.65 | |
| 4.5 Py | 0.36 | 2.13 | S.E. | | 1.68 |

[1] Percent by weight exclusive of the weight of the foaming agent, CFCl₃; T=trimellitic anhydride; Py=pyromellitic dianhydride.
[2] Flammability rating described in ASTM D1692-59T. S.E.=self-extinguishing rating.

Examples 27 to 32 when used in conjunction with Example 14 (Table I) illustrate a synergistic reduction in foam flammability when combinations of trimellitic anhydride and the diphosphate or pyromellitic dianhydride and the same diphosphate are used as the flame-retardant mixture. Their effect together, as seen in Table III, is greater than the effect of any one alone.

In like manner polyurethane foams are flame-retarded by using a synergistic combination of aminonaphthalene-1,8-dicarboxylic anhydride and tris-dipropyleneglycol phosphate; 2,6-dichloronaphthalene dianhydride and bis-polypropyleneglycol hydroxypropylphosphonate; phenanthrene-1,3,9,10-tetracarboxylic dianhydride and tris-diethyleneglycol phosphite; bis(3,4 - dicarboxyphenyl)ether dianhydride and tris-dipropyleneglycol phosphite; diphenyl-3'-methylamino - 3,4 - dicarboxylic anhydride and tetrakis-dipropyleneglycol 1,2-diphosphonoethane; etc., the total amount of both components being less than required for flame-retardancy if they were functioning by a simple additive effect.

Although specific examples of the invention have been set forth hereinabove, it is not intended to limit the invention thereto, but to include all of the variations and modifications falling within the scope of the appended claims.

We claim:

1. A flame-retarded rigid polyurethane foam having incorporated therein a flame-retarding amount of a composition comprising a combination of (1) a mono or dinuclear aromatic acid anhydride having the structural formula:

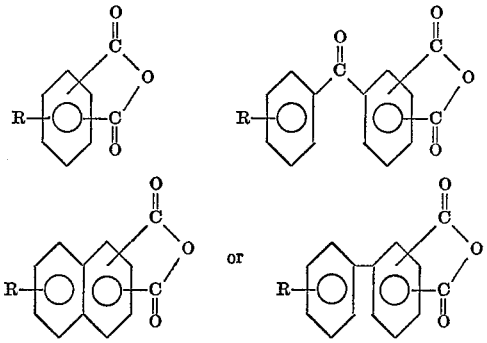

wherein R is carboxyl, hydroxyl, primary amino, methylamino, or anhydro and (2) a phosphorus-containing polyol having the structural formula:

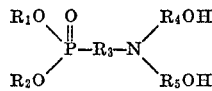

wherein $R_1$ and $R_2$ are lower alkyl or lower haloalkyl radicals and $R_3$, $R_4$ and $R_5$ are lower alkylene radicals, or

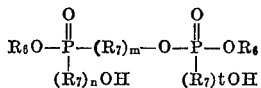

wherein $R_6$ is an alkyl group having one to six carbon atoms, $R_7$ is the group —$OCH_2CH(CH_3)$— and $m$, $n$ and $t$ are a number from one to seven, the sum of the flame-retarding amounts of components (1) and (2) being less than the sum of components (1) and (2) that are required in the same polymer to function in a flame-retarding manner by a simple additive effect.

2. A flame-retarded rigid polyurethane foam in accordance with claim 1 in which (1) is trimellitic anhydride.

3. A flame-retarded rigid polyurethane foam in accordance with claim 1 in which (1) is pyromellitic dianhydride.

4. A flame-retarded rigid polyurethane foam in accordance with claim 1 in which (1) is 3,4,3',4'-benzophenonetetracarboxylic dianhydride.

5. A flame-retarded rigid polyurethane foam in accordance with claim 4 in which (2) is diethyl N,N-bis(2-hydroxyethyl)aminomethylphosphonate.

6. A flame-retarded rigid polyurethane foam in accordance with claim 4 in which (2) is polyoxypropylene alkoxy diphosphate.

7. A flame-retarded rigid polyurethane foam in accordance with claim 6 in which the polyoxypropylene alkoxy diphosphate is a mixture of related molecules having the structure.

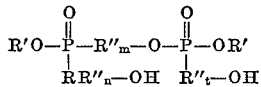

wherein $m$, $n$ and $t$ vary from one to seven, R' is ethyl or butyl and R'' is the group —$O$—$CH_2CH(CH_3)$—.

References Cited

UNITED STATES PATENTS

| | | | |
|---|---|---|---|
| 3,178,490 | 4/1965 | Petrino et al. | 260—2.5 |
| 3,257,337 | 6/1966 | Schoepfle et al. | 260—2.5 |
| 3,249,562 | 5/1966 | Schoepfle et al. | 260—2.5 |
| 2,953,533 | 9/1960 | Khawam | 260—2.5 |
| 3,259,593 | 7/1966 | Eichhorn | 260—2.5 |
| 3,294,710 | 12/1966 | Rosenberg et al. | 260—2.5 |
| 3,365,470 | 1/1968 | Schmerling | 260—346.6 |

FOREIGN PATENTS

| | | | |
|---|---|---|---|
| 285,690 | 9/1966 | Australia | 260—2.5 |

DONALD E. CZAJA, Primary Examiner

R. W. GRIFFIN, Assistant Examiner

U.S. Cl. X.R.

260—2.5 AH, 2.5 AR, 2.5 AM, 77.5 AR, DIG. 24

UNITED STATES PATENT OFFICE
CERTIFICATE OF CORRECTION

PO-1050
(5/69)

Patent No. 3,684,748  Dated August 15, 1972

Inventor(s) Walter P. Barie, Jr., Norman W. Franke and Gary M. Singerman.

It is certified that error appears in the above-identified patent and that said Letters Patent are hereby corrected as shown below:

Col. 1, lines 8 and 9, that portion reading "Monroeville, Borough, Pa.," should read --Borough of Monroeville, Allegheny County, all of Pa.--. Col. 4, line 48, "hydoxyalkyl" should read --hydroxyalkyl--. Col. 6, lines 11 and 12, "are trimethylolethane," should read --are trimethylolpropane, trimethylolethane--. Col. 6, line 35, "polyphenylsicocyanate" should read --polyphenylisocyanate--. Col. 6, line 57, "phorous polyol" should read --phorus polyol--. Col. 7, line 14, "form" should read --foam--. Col. 7, line 38, "monochlorethane" should read --monochloroethane--. Col. 9, line 65, "Fuorotrichloromethane" should read --Fluorotrichloromethane--. Col. 9, in Table I, the numbers --1 through 22-- should be inserted in a vertical column at the extreme left. Col. 10, in Table II, the numbers --23 through 26-- should be inserted in a vertical column at the extreme left. Col. 10, in Table III, the numbers --27 through 32-- should be inserted in a vertical column at the extreme left. Col. 12, Claim 7, line 25, that portion of the structural formula reading $\overset{|}{R}R"_n$ -OH     should read     $\overset{|}{R"_n}$ -OH Signed and sealed this 23rd day of January 1973.

(SEAL)
Attest:

EDWARD M. FLETCHER, JR.
Attesting Officer

ROBERT GOTTSCHALK
Commissioner of Patents